(12) United States Patent
Wozniak et al.

(10) Patent No.: US 7,198,301 B2
(45) Date of Patent: Apr. 3, 2007

(54) SUSPENSION SYSTEM FOR A VEHICLE WITH A TANK FOR LIQUIFIED GAS

(75) Inventors: John J. Wozniak, Columbia, MD (US); Richard J. Hildebrand, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 344 days.

(21) Appl. No.: 10/494,643

(22) PCT Filed: Nov. 1, 2002

(86) PCT No.: PCT/US02/35250

§ 371 (c)(1),
(2), (4) Date: May 5, 2004

(87) PCT Pub. No.: WO03/039891

PCT Pub. Date: May 15, 2003

(65) Prior Publication Data

US 2004/0239095 A1 Dec. 2, 2004

Related U.S. Application Data

(60) Provisional application No. 60/332,836, filed on Nov. 6, 2001.

(51) Int. Cl.
*B60P 3/22* (2006.01)
(52) U.S. Cl. ............................................. 280/830
(58) Field of Classification Search ......... 280/124.109, 280/781, 782, 783, 785, 788, 789, 830; 180/311, 180/313
See application file for complete search history.

(56) References Cited

U.S. PATENT DOCUMENTS

| 2,196,556 | A | * | 4/1940 | Hollos .......................... 180/363 |
| 3,129,014 | A | * | 4/1964 | Hutchison et al. ............ 280/830 |
| 3,292,944 | A | * | 12/1966 | Dangauthier ......... 280/124.107 |
| 4,085,945 | A | * | 4/1978 | Bicht et al. ................. 280/788 |
| 4,717,171 | A | * | 1/1988 | Kami et al. .................. 280/834 |
| 5,560,651 | A | * | 10/1996 | Kami et al. .................. 280/788 |
| 5,609,366 | A | * | 3/1997 | Kamei et al. ................ 280/788 |
| 5,673,939 | A |   | 10/1997 | Klingensmith et al. |
| 5,702,125 | A | * | 12/1997 | Nakajima et al. ............ 280/834 |
| 5,890,740 | A | * | 4/1999 | Kami ........................... 280/834 |

(Continued)

FOREIGN PATENT DOCUMENTS

DE       29 20 315       11/1980

(Continued)

OTHER PUBLICATIONS

Vehicule automobile de tourisme, Dr. Ing, Poschce KG, Mar. 22, 1968, No. 1.518.295, pp. 1-3 and figs. 1-4.

*Primary Examiner*—Eric Culbreth
*Assistant Examiner*—Barry Gooden, Jr.
(74) *Attorney, Agent, or Firm*—Francis A. Cooch

(57) ABSTRACT

A suspension system for carrying a compressed gas fuels in vehicle. The suspensions arms and springs are configured to maximize the space between the wheels while providing a high degree of suspension stiffness to maintain proper wheel alignment during cornering, braking and in rough terrain. The suspension arms have two broadly-spaced attachment points to the chassis that provides structural rigidity to the rear suspension subassembly.

32 Claims, 6 Drawing Sheets

U.S. PATENT DOCUMENTS

| | | | |
|---|---|---|---|
| 5,924,734 A * | 7/1999 | Fukagawa et al. | 280/830 |
| 5,992,885 A | 11/1999 | Fukagawa et al. | |
| 6,086,103 A * | 7/2000 | Fukagawa et al. | 280/830 |
| 6,170,875 B1 * | 1/2001 | Jones et al. | 280/788 |
| 6,311,996 B1 * | 11/2001 | Kato et al. | 280/124.134 |
| 6,457,729 B2 * | 10/2002 | Stenvall | 280/124.134 |
| 6,672,620 B2 * | 1/2004 | Kawazu et al. | 280/834 |
| 6,983,945 B2 * | 1/2006 | Kawasaki et al. | 280/834 |
| 2001/0022323 A1 * | 9/2001 | Aslakson | 239/172 |
| 2001/0027890 A1 * | 10/2001 | Bria et al. | 180/291 |
| 2003/0047932 A1 * | 3/2003 | Kawazu et al. | 280/830 |
| 2004/0239095 A1 * | 12/2004 | Wozniak et al. | 280/834 |
| 2005/0161935 A1 * | 7/2005 | Ono et al. | 280/834 |

FOREIGN PATENT DOCUMENTS

| | | |
|---|---|---|
| DE | 36 22 552 | 1/1988 |
| DE | 199 53 156 | 5/2000 |
| JP | 59014509 | 1/1984 |
| JP | 11198623 | 7/1999 |

* cited by examiner

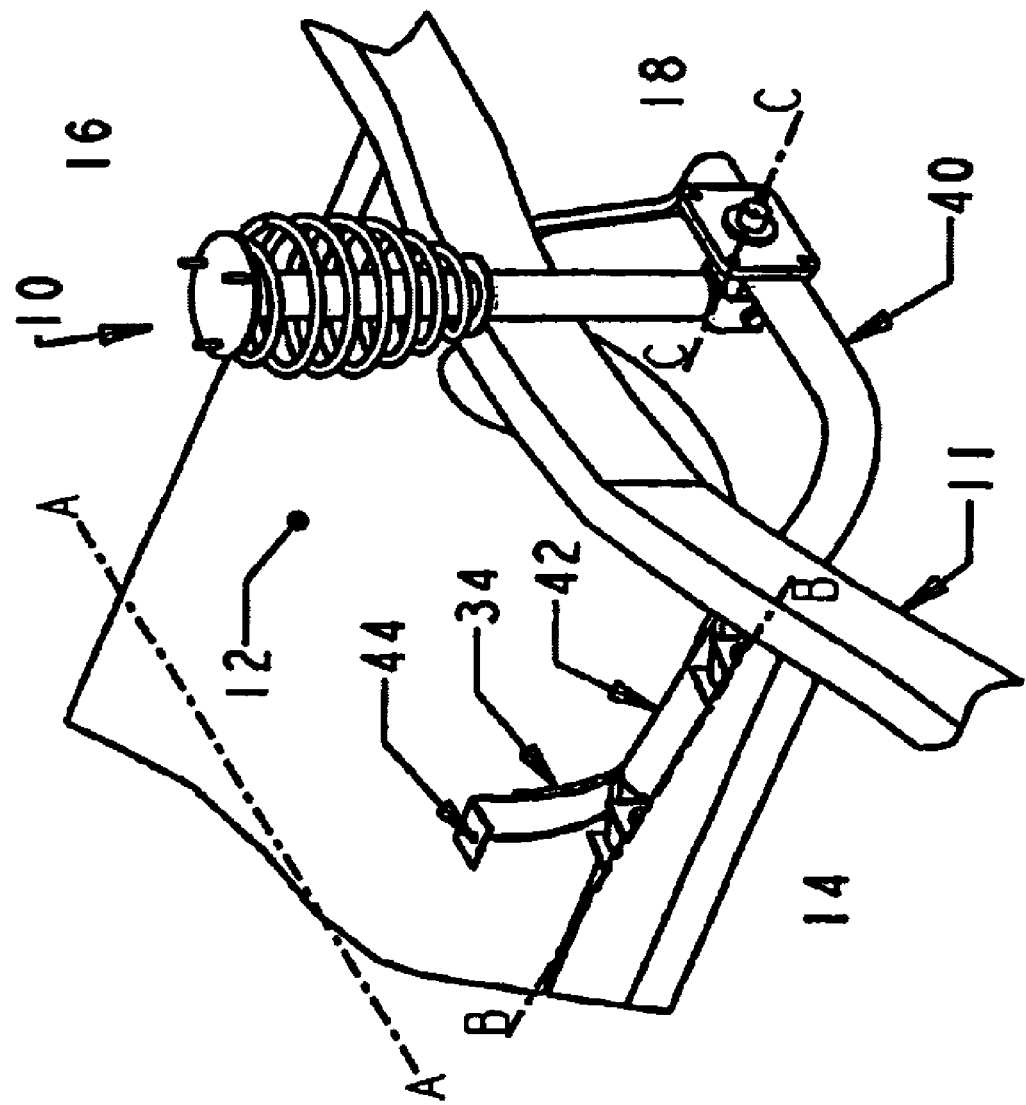

SUSPENSION SYSTEM FOR A VEHICLE WITH A TANK FOR LIQUIFIED GAS

CROSS-REFERENCE TO RELATED APPLICATION

This application claims priority to U.S. Provisional Application No. 60/332,836 filed on Nov. 6, 2001, the contents of which are incorporated by reference herein.

BACKGROUND OF THE INVENTION

1. Field of the Invention

The present invention relates to a method and system for the onboard storage of a large volume of high-pressure hydrogen or natural gas on vehicles powered by either internal combustion engines or fuel cells. Particularly, this invention relates to a rear suspension subassembly having improved structural rigidity, that is designed to straddle a large diameter high-pressure storage tank with high volumetric efficiency.

2. Description of the Relation Art

Hydrogen powered Fuel Cell Vehicles (FCV) and natural gas powered vehicles are solution to problems of air quality and dependency on petroleum fuel. Fuel cells produce electricity by combining hydrogen with oxygen from air to produce electrical power and give off only water vapor. Natural gas fueled internal combustion engine vehicles produce exhaust emissions that are a fraction of diesel or gasoline fueled counterparts. The onboard vehicle storage of hydrogen gas or natural gas poses challenges in the areas of relatively low energy density, system cost, crashworthiness, and vehicle packaging. Gaseous fuels (e.g., hydrogen and natural gas), stored at high pressure, carry a fraction (between $\frac{1}{3}^{rd}$ and $\frac{1}{8}^{th}$) of the energy density compared to gasoline or diesel fuels. To have an acceptable driving range, significant container volume is needed. Furthermore high-pressure tanks are most efficiently built as cylinders, with large diameter cylinders offering high volumetric efficiencies and manufacturing cost advantages needed for practical and affordable gaseous fuel vehicles. Large cylinders however pose a problem for vehicle packaging, impacting vehicle interior space (passenger, trunk or truckbed), undercarriage clearance and/or room for suspension assemblies that provide handling and ride acceptable to drivers. To support crashworthiness the storage tank needs to be placed as far as possible from the back of the vehicle for structural protection. In designing a suspension system that straddles a large diameter tank full consideration of the functions of the suspension system must be taken into account. The purpose of the suspension system is to (1) support the weight of the vehicle, (2) cushion bumps and holes on the road, (3) maintain traction between the tires and the road and (4) hold the wheels in alignment.

The suspension assembly includes springs, dampers, linkages and tires that control the way in which a vehicle moves and reacts to roadway disturbances and directional changes.

The angular and vertical movements of the wheels provide directional control compensating for (or utilize) body roll to improve cornering and respond to roadway irregularities in order to smooth out the ride and maintain adhesion. Wheels are connected to the sprung mass (car body) through linkages and are therefore affected by the rolling and pitching movements that occur about the suspensions system's reaction centers. It is critical that the suspension linkages be designed to allow the wheels to meet the dynamic requirements of various combinations of events. However, the designer is constrained by mechanical conflicts between structural members, and fuel storage containers that also must fit into the vehicle.

A large-volume gaseous fuel tank, mounted between the rear wheels provides suspension design and structural difficulties. As a result, the rear suspension may not be sufficiently stiff to keep the rear wheels aligned, which leads to the vehicle's lateral instability, particularly when it is driven on rough terrain. To minimize the lateral instability, the rear suspension has to be designed to exhibit enhanced stiffness or rigidity to minimize the negative effect produced by the road irregularities on the wheels.

U.S. Pat. Nos. 5,924,734 and 6,086,103 disclose a rear suspension flanking a fuel tank assembly and attached to the front portion of the vehicle by means of front ends of opposite trailing (control) arms in front of the fuel tank assembly. Accordingly, the rear suspension has only two reaction points aligned with one another and spaced frontward from the wheel axis. This structure may not be rigid enough to provide stiffness sufficient to keep the rear wheels aligned. Misalignment of the rear wheels leading to the lateral instability of the car renders the ride both unpleasant and unsafe. In addition stabilizing arms aligned with the principal axis of the storage tank and the wheel occupy valuable space in the undercarriage that reduces the overall tank length and thus the volume of gaseous fuel that can be carried onboard.

It is desirable to increase stiffness of a rear suspension while providing for a large open space between the wheels, unencumbered by stiffening arms in order to house a longer tank and thus a large volume of compressed gas fuel.

SUMMARY OF THE INVENTION

This objective of this invention is to provide a system consisting of a rear suspension subassembly shaped to extend around the fuel tank and operatively attached to the front and rear portions of the vehicle so that the front and rear portions of the vehicle provide structural rigidity for the suspension assembly, allowing the longest possible tank to be nestled between the rear wheels.

There are two embodiments in the inventive suspension assembly (1) a semi-trailing design consisting of arms mounted to a forward crossmember that extend past the centerline of wheel assemblies to have their free ends connected by a stabilizing lateral link and (2) a wishbone design with arms that straddle the tank and attach to both a forward and aft crossmember. The two advantages of either embodiment of the inventive suspension subassembly is its improved rigidity for enhanced handling and maximizing the space between the rear wheels for a larger storage volume tank.

Wrapping the rear suspension subassembly around a single fuel tank allows the inventive assembly to efficiently carry a large volume of gas while minimizing the loss of space within the passenger compartment or trunk. The single large diameter fuel tank is the most cost, weight and volumetric efficient storage container for high-pressure gas. Attaching the tank to body of the vehicle as far away as reasonable from the rear bumper and surrounding it by the rear suspension affords high crashworthiness protection in case of a rear or side impact collision.

It is, therefore, an object of the present invention to provide a rear suspension subassembly with improved rigidity so as to hold the rear wheels of the vehicle in alignment under severe road conditions Still another object of the invention is to provide a rear suspension assembly, which has a minimum structure between the wheel centerline to enable carrying a single large-diameter, long overall length gaseous storage tank, configured to maximize fuel volume.

Yet a further object of the invention is to provide an arrangement that allows for the onboard storage of a large volume tank while minimizing intrusion into the trunk compartment or passenger space and yet provide sufficient undercarriage ground clearance.

Yet a further object of this invention is to provide an arrangement that positions a large diameter, high-pressure gaseous fuel tank as far as possible from the rear of the vehicle for crashworthiness protection.

BRIEF DESCRIPTION OF THE DRAWINGS

The above and other objects, features and advantages of the present invention will become more apparent from the following detailed description when taken in conjunction with the accompanying drawings in which:

FIG. 1A is an isometric view of the trailing arm design inventive assembly including a rear suspension subassembly and a fuel tank;

DESCRIPTION OF THE PREFERRED EMBODIMENTS

Figure 1B:
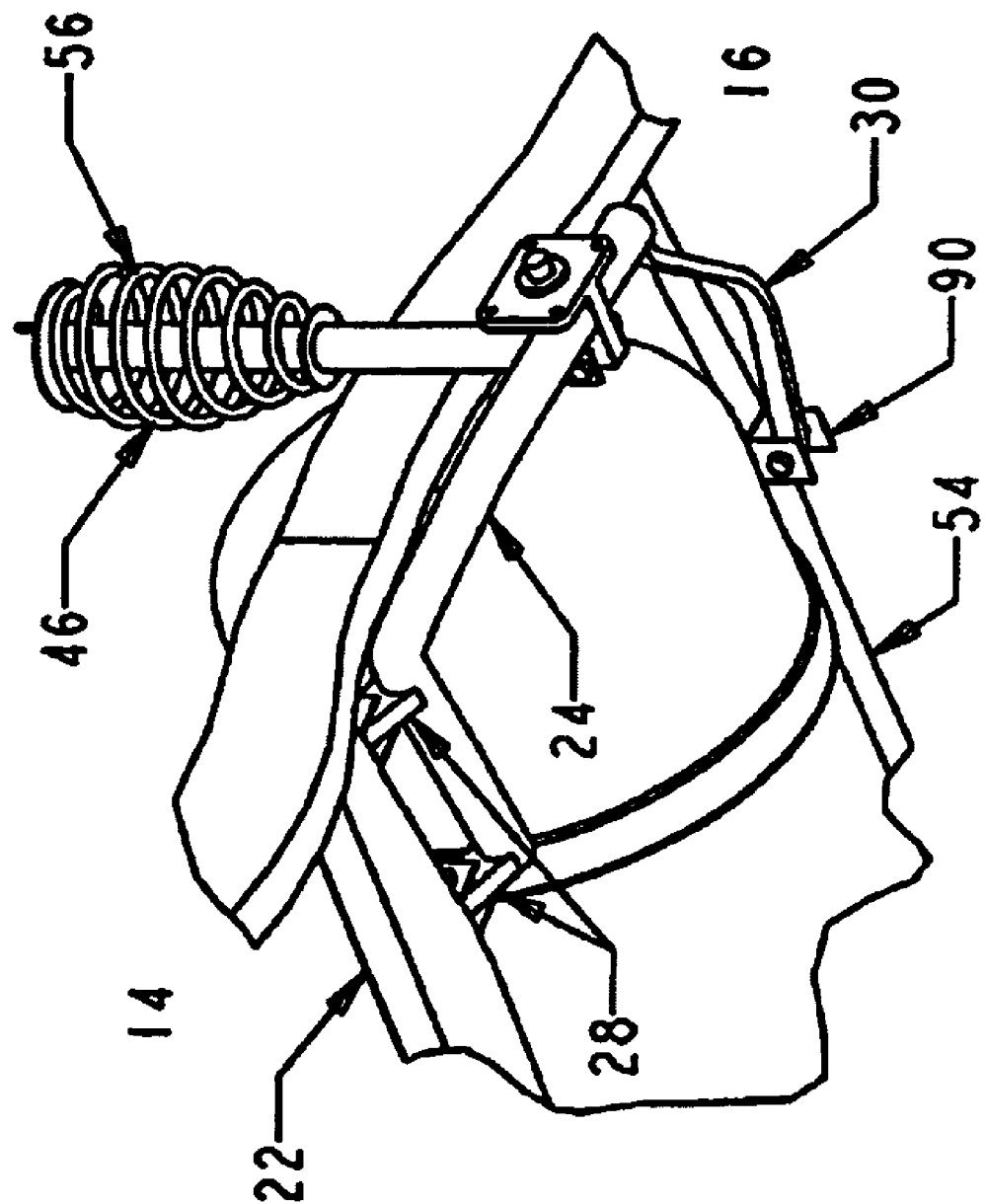
FIGS. 1B and 2B are bottom isometric views of the inventive assembly corresponding to FIGS. 1A and 2A, respectively.

A preferred embodiment of the present invention will be described herein below with reference to the accompanying drawings. In the following description, well-known functions or constructions are not described in detail since they would obscure the invention in unnecessary detail.

Referring to FIGS. 1–5, a rear-suspension assembly for the chassis 10 (FIGS. 1A, 1B, 2A and 2B) of a vehicle powered by a combustion engine or a fuel cell is configured to conform to a contour of a single, lightweight, all-composite gaseous storage tank 12. The inventive configuration of the inventive suspension assembly designs, i.e., a trailing arm design, as illustrated in FIGS. 1A–1B, and a wishbone design, as seen in FIGS. 2A–2B, allows both front 14 and rear 16 (FIG. 2) portions of the vehicle to contribute to the overall rigidity of the suspension, particularly to a rear suspension subassembly 18. As a consequence of enhanced rigidity, the rear suspension subassembly 18 exhibits the improved ability of keeping the rear wheel assemblies 20 (FIG. 5) aligned even on rough terrain.

For the trailing arm design, as seen in FIG. 1A, the rear suspension subassembly 18 has two crossmembers 22 and 54 (FIGS. 1–4), attached to a chassis frame 11 (FIG. 1A). While numerous types of fasteners 52 (FIG. 3) can be used for coupling the crossmembers to the chassis, elastomeric bushings decoupling the suspension from the chassis to reduce noise and harshness transmitted to the passengers are preferred. The crossmember 22 serves as a support for a pair of angled control arms 24 (FIG. 1B) and crossmember 54 serves as a support for a pair of lateral links 30. Preferably, the control arms each have a longitudinal or trailing portion 40, which generally extends parallel to a longitudinal axis A—A of the vehicle and past the centerline C—C of the wheel assemblies (FIG. 5), and by a transverse portion 42, which extends along the crossmember. Accordingly, the control arms each generally have an L-shape.

The control arms of the present invention, as shown in FIGS. 1A–1B, are semi-trailing arms. As known, the semi-trailing arms angle inboard and toward the rear portion 16 of the vehicle while being pivotally mounted on the crossmember 22. Accordingly, each hinge axis B—B (FIG. 1A) extends at an angle to the vehicle longitudinal axis A—A (centerline) differing from a right angle. With semi-trailing arm suspensions the wheels 20 (FIG. 5) is free to bounce independently.

Note that although the rear wheel subassembly, as disclosed above, is the semi-trailing arm type, a trailing arm type suspension subassembly can be used as well within the broadest scope of the present invention. The difference between the two designs is that the axis of the trailing arm is at a right angle to the vehicle centerline. The advantage posed by the semi-trailing system is that the angle offset enhances vehicle control during cornering.

Figure 2A:
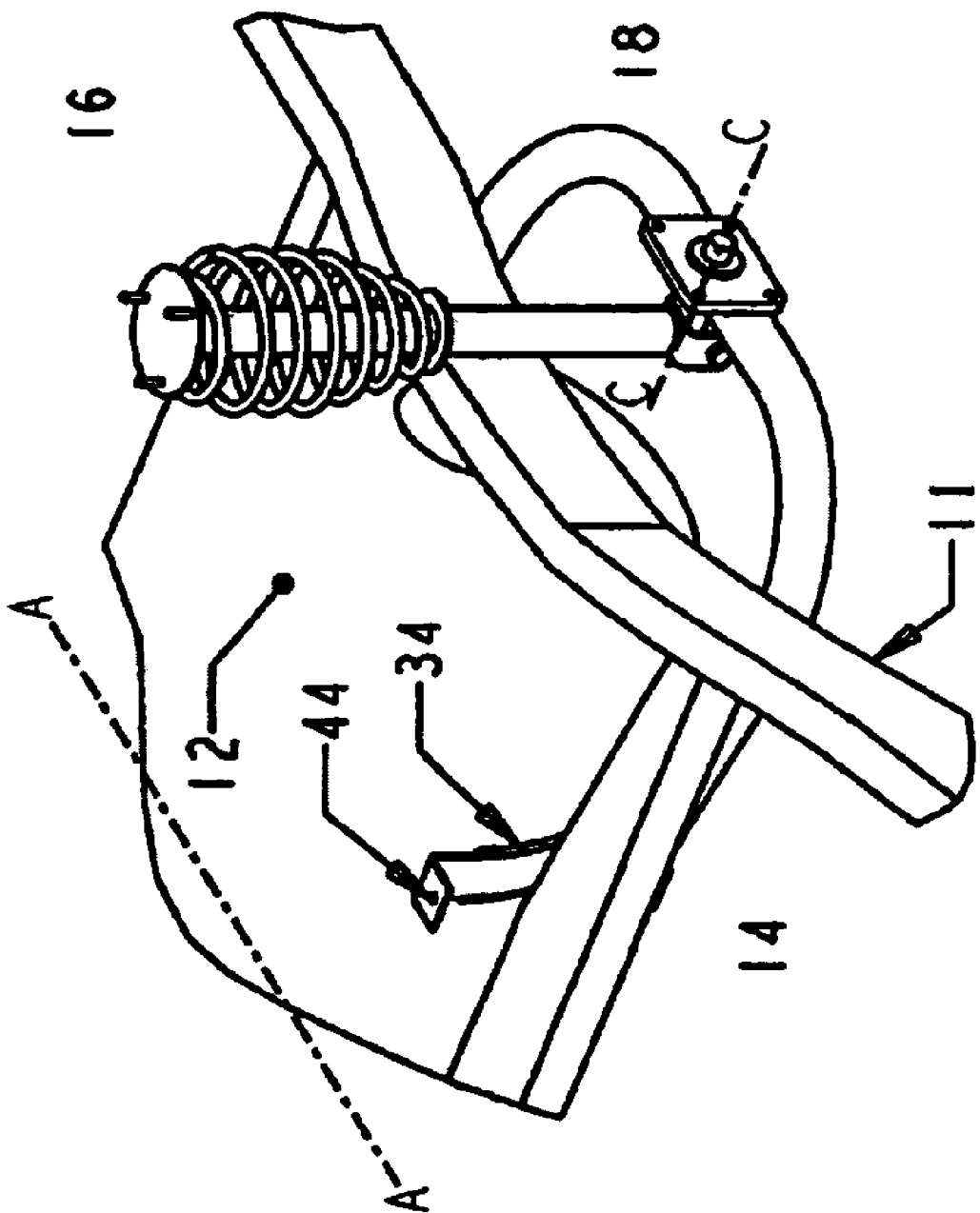
FIG. 2A is an isometric view of the wishbone design inventive assembly including a rear suspension subassembly and fuel tank.
Figure 2B:
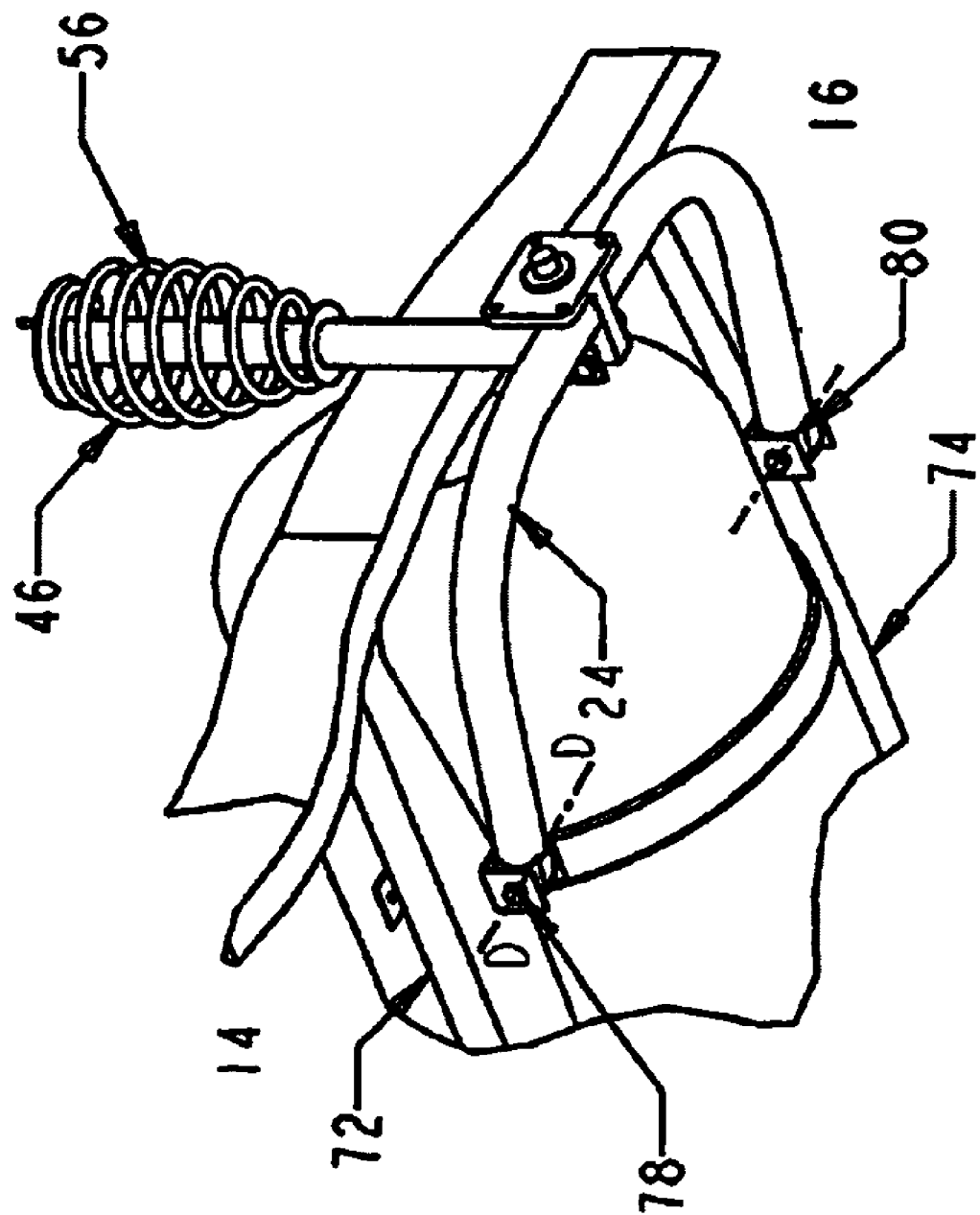
Figure 3:
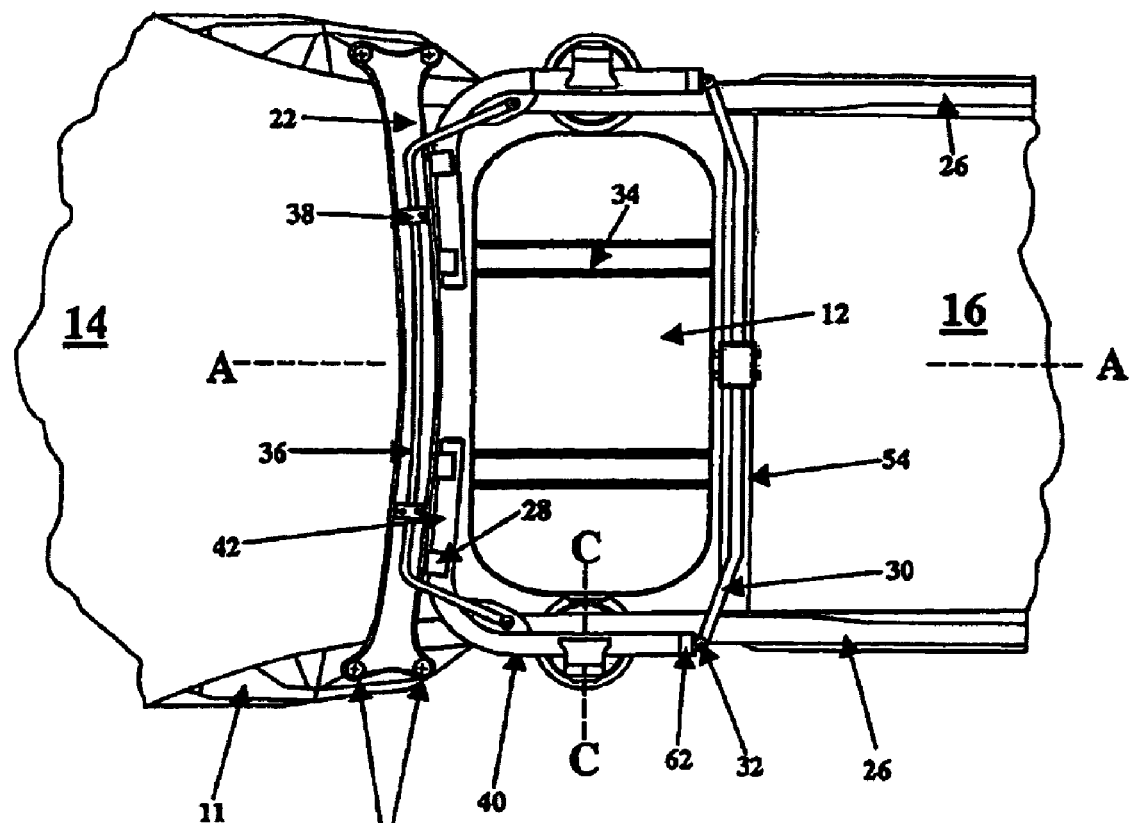
FIG. 3 is a bottom plan view of the inventive assembly.
Figure 4:
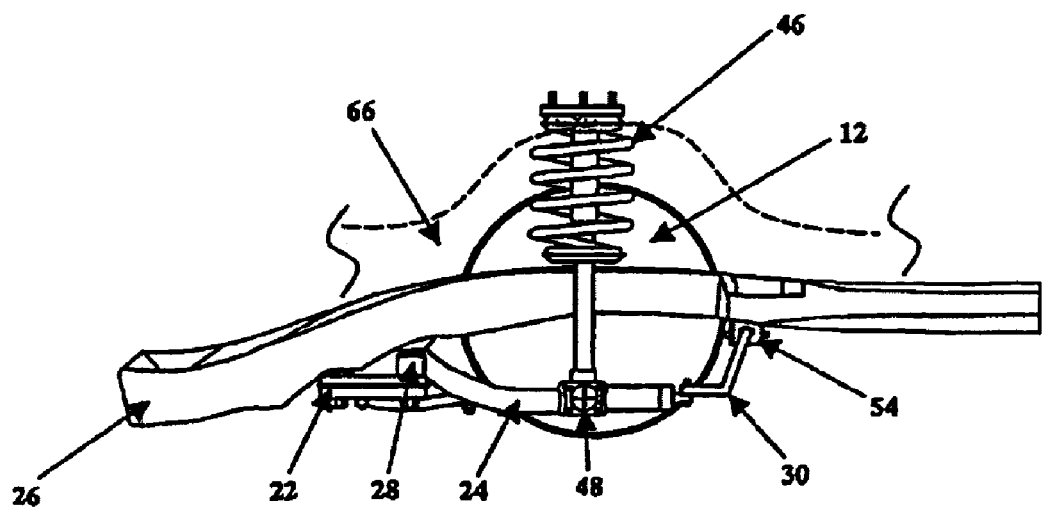
FIG. 4 is a side view of the inventive assembly.

Referring to FIGS. 2A–2B, in the wishbone design, the suspension arm 24 has a U-shape and is formed in a structure similar to the breastbone in a bird ("the wishbone"). The U-shaped arms each may be formed by welding together two (2) J-shape halves or by being provided with a unitary U-shaped body. In particular, the suspension arms 24 include two fulcrums hinged about axes D—D, which extend parallel to the longitudinal axis A—A of the vehicle chassis, and attach to a forward 72 and aft 74 crossmember at pivotal attachment points 78 and 80. The wheels are free to bounce independently. The hinge point of the wishbone design enables the tire to change its contact area with the road depending on wheel vertical movement thus enhancing vehicle control during cornering. The forward 78 and aft 80 attachment points of the arms to the forward 72 and aft 74 crossmembers provides the rigidity needed for vehicle handling and control.

Returning to FIGS. 1A–1B, in a semi-trailing design, the transverse portions 42 each are pivotally mounted on the crossmember 22 by means of multiple hinges 28. As better shown in FIG. 1A, each hinge 28 has a rubber bushing with a brass or bronze insert and a large bolt which allows the arms, in accordance with the basic principle of the semi-trailing suspension, to pivot somewhat relative to the crossmember. To have the hinge axes B—B inclined with respect to the longitudinal axis A—A, the crossmember 22 has a bearing surface, which faces the transverse portions 42, with a rearwardly concave cross-section. Other modifications of the shape of the crossmember 22 and the semi-trailing arms 24 are, of course, possible without, however, compromising the principle of the operation of the semi-trailing arm suspension assembly.

Figure 5:
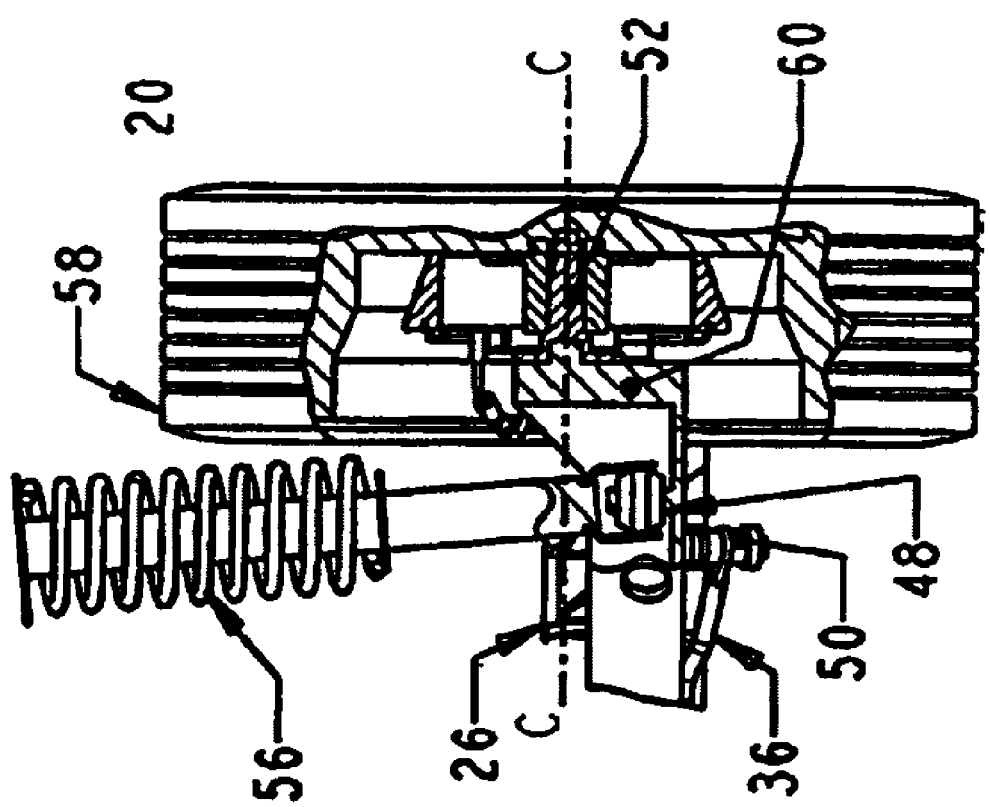
FIG. 5 is an elevated, partially broken front view of the inventive assembly in combination with a wheel assembly.

The trailing or longitudinal portions 40 of the semi-trailing arms 24 or wishbone structure each support a spring and shock-absorber unit 46 (FIG. 1B, 2B and 4) attached to the chassis. One of possible modifications of a unit mount 48, as shown in FIG. 5, may be similar to the hinges 28. In a preferred embodiment of the present invention, a MacPherson strut (combined spring/shock absorber) is selected to maximize the useful space offered by the inventive assembly. Particularly, a coil spring 56 (FIGS. 1B, 2B and 5) resides in the open space between the wheel assembly 20 and the gaseous storage tank 12 and terminates above the tire 58. As is with other components of the present invention, the MacPherson strut can be replaced with a system of separate shock absorbers and springs. However, the separate spring/shock system occupies added space between the wheels reducing the length of the gaseous storage tank and hence its volume.

Referring to FIG. 5, to attach the semi-trailing arms 24 to the wheel assemblies 20, the longitudinal portions 40 of the arms are rigidly connected to a wheel mount 60, which, in turn, is rigidly connected to a spindle 52 of the wheel assemblies 20.

One of the main advantages of the inventive semi-trailing suspension subassembly 18, the improved stiffness, is obtained by a connecting structure including at least one lateral stabilizing link 30 coupled to free ends 62 of the longitudinal portions 40 of the arms. As a result, each semi-trailing arm 24 has a front point of attachment—the connection between the transverse portions 42 and the crossmember 22, and a rear point of attachment, which is a ball joint 32 coupling the longitudinal portion and the lateral stabilizing link 30. Thus, each of the control arms has two attachment points which are broadly spaced apart from the centerline C—C of the wheel assembly in opposite directions along the longitudinal axis A—A. The broad spacing and structure of the rear suspension subassembly is more stable, than, for example, a two-point, narrowly spaced apart attachment, structure of the discussed prior art patents. Accordingly, the increased stiffness of the inventive rear suspension subassembly 18 substantially minimizes lateral motion of the rear wheel assemblies even on rough terrain. The stabilizing link 30 is attached to the crossmember 54 extending between longitudinal rails 26 of the chassis frame through a hinge 90. More than one lateral link can be provided to even further increase the lateral stability of the suspension. The lateral stabilizing link functions to allow vertical motion of the wheel assemblies while limiting lateral movement. In addition, the inventive suspension subassembly 18 has an anti roll bar 36, a central portion of which is suspended on mounts 38 located on the underside of the crossmember.22, as shown in FIG. 2. As better illustrated in FIG. 5, opposite bent portions of the anti roll bar 36 are articulately attached to the trailing or longitudinal portions 40 by joints 50. The locations of the joints 50 are offset from the hinges 28 and are spaced from the free ends 62 of the arms 24. The anti-roll bar reduces body roll, which happens when the vehicle leans toward the outside of the turn, and thus provides for the better handling of the vehicle.

In the wishbone embodiment, improved wheel control is obtained by connecting to two crossmembers one forward and the other aft of the space created for the storage tank. The wishbone fulcrum arms are attached to the crossmembers with a bushing hinge joint parallel to axis A—A. This arrangement stiffens lateral stability of each wheel, while allowing for wheel camber angle with the vertical motion of the wheel thus enhancing vehicle control in cornering. The wishbone arm arrangement with its two attachment points spaced from the centerline C—C of the wheel is more stable, than, for example, a two-point attachment structure of the discussed prior art patents.

Additionally, unlike the prior art wherein the stabilizing arm and its attachment frame occupy valuable space between the wheels, the wishbone and trailing arm with lateral link straddles the tank space thus allowing for a longer length and thus larger volume tank to be placed onboard.

The inventive rear suspensions including the crossmember 22, the semi-trailing arms 24 and the lateral stabilizing or stabilizer links 30, in the trailing arm design, or the crossmembers 72 and 74 and U-shaped arm 24 in the wishbone design, is shaped and dimensioned to substantially conform to the contour of the storage tank 12 and to wrap around it. While the location of the tank axis can be slightly displaced frontwards or rearwards from the centerline of the wheels, the configuration and dimension of the inventive subassembly makes it possible to have the tank axis and the centerline C—C of the wheel assemblies extend coplanar in a vertical plane. The single gaseous storage tank 12 intended to contain a large volume of high-pressure hydrogen or natural gas onboard the front-wheel-vehicle is suspended to the car body to help de-couple load transfer in the event of a rear or side end collision. To maintain the unsprung weight of the inventive subassembly 18 low and to minimize the space occupied by the semi-trailing arms 24 and, thus, to maximize the size of the storage tank 12, the arms could be formed from high strength steel tubing. Other materials may include, for example, aluminum and magnesium.

To mount the gaseous storage tank 12, the vehicle has a protrusion 66 (FIG. 4) stamped into a floor pan of the vehicle and receiving a smaller portion of the tank. Multiple U-shaped straps 34 extending around a lower half portion of the tank circumference extend substantially vertically towards the floor of the vehicle and engage in recesses formed in the floor. The straps can be formed with horizontal top portions 44 which have a plurality of openings traversed by fasteners. The rear wheel subassembly 18 is dimensioned so that when the tank is nestled therein, the loss of space in the passenger compartment and the trunk is minimized. All necessary tank valving and safety devices are housed within the tank boss for safety protection. The circumference of the gaseous storage tank is distributed between the trunk and undercarriage space under the floor.

As shown in the drawings and disclosed above, the crossmember 22 is spaced frontward from the centerline C—C of the wheel assemblies. Numerous designs have been considered such as the reversed structure, in which the crossmember is spaced rearward from the wheel centerline C—C. However, the preferred forward location of the crossmember, as discussed above, is optimal because it is mounted in small space in the underchassis under the rear seat. If the crossmember is moved to the rear of the automobile, it would be located in the space normally occupied by the spare tire. Furthermore, the reversed location of the crossmember would not allow the gaseous tank to be mounted further forward because the tank would move into the passenger space affecting, thus, the rear seat. Thus, the rear subassembly, as shown and described, optimizes the location of the gaseous storage tank and provides it with an improved collision protection.

The foregoing is considered as illustrative of the principles of the invention. Accordingly all suitable modifications and equivalents may be resorted to, falling within the scope of the invention considered in light of the appended claims.

What is claimed is:
1. A suspension assembly for
a vehicle having a body, comprising:
a chassis frame;
a gaseous storage tank attached to the body; and
a rear suspension subassembly coupled to the chassis frame and straddling the gaseous storage tank, wherein the rear suspension subassembly includes two crossmembers and two U-shaped arms each having a respective pair of fulcrums spaced longitudinally apart and off a centerline of a respective wheel assembly, the ful- crums being attached to the two crossmembers with a hinge joint extending parallel to the longitudinal axis of the body of the vehicle.

2. The assembly of claim 1, wherein each of the U-shaped arms includes two J-shaped halves, longitudinal portions of which are joined together in a plane including the centerline of the respective wheel assembly, or a unitary U-shaped body, whereby, the U-shaped arms and the two crossmembers form the wishbone suspension assembly straddling the gaseous storage tank.

3. The assembly of claim 1, wherein the rear subassembly further has two spring/shock absorber units each pivotally mounted on the respective longitudinal portion of the U-shaped arms and attached to the chassis frame, each of the two spring/shock absorber units being a combined shock absorber/spring assembly, the chassis frame including spaced elongated rails longitudinally extending between rear and front portions of the body, the U-shaped arms being made from steel or aluminum and the two crossmember being made from steel, aluminum, or magnesium.

4. The assembly of claim 1, wherein the gaseous storage tank is a single container made from composite materials and having a circumference, a fraction of the circumference protruding into a protrusion stamped into a floor pan of the body of the vehicle and the remaining fraction of the circumference extending into an undercarriage of the vehicle.

5. The assembly of claim 4 wherein the gaseous storage tank has a plurality of spaced U-shaped mounting straps securing the storage tank from underneath and coupled with the floor pan.

6. The assembly of claim 1, further comprising an internal combustion engine or a fuel cell powering the vehicle.

7. A suspension assembly for a vehicle having a body, comprising:
   a chassis frame:
   a gaseous storage tank attached to the body; and
   a rear suspension subassembly coupled to the chassis frame and straddling the gaseous storage tank, wherein the rear suspension subassembly includes at least one crossmember and two L-shaped control arms each having transverse and longitudinal portions, the transverse portions extending along the at least one crossmember and coupled thereto, the longitudinal portions each extending angularly from the transverse member and extending past a center line of a respective rear wheel assembly, wherein the transverse portions of the L-shaped control arms are pivotally mounted on the at least one crossmember to swing about respective horizontal pivot axes each extending toward a longitudinal axis of the body of the vehicle at an angle differing from a right angle.

8. The assembly of claim 7, wherein the rear suspension subassembly further includes a stabilizing link extending between free ends of the longitudinal portions of the L-shaped control arms and coupled thereto, so that the crossmember, control arms and the stabilizing link extend around and straddle the gaseous storage tank therebetween.

9. The assembly of claim 8, wherein the stabilizing link is operatively coupled to the chassis frame.

10. The assembly of claim 7, wherein the control arms are semi-trailing arms.

11. The assembly of claim 7, wherein the transverse portions of the control arms each have a hinge pivotally coupling a respective transverse portion to the at least one crossmember.

12. The assembly of claim 7, wherein the control arms are formed from steel or aluminum and the crossmember being made from steel or aluminum.

13. The vehicle of claim 7, wherein the longitudinal portions of the control arms each are coupled with a spindle of the respective rear wheel assembly.

14. A suspension assembly for a vehicle having a body, comprising:
   a chassis frame;
   a gaseous storage tank attached to the body; and
   a rear suspension subassembly coupled to the chassis frame and straddling the gaseous storage tank, wherein the rear suspension subassembly includes at least one crossmember and two L-shaped control arms each having transverse and longitudinal portions, the transverse portions extending along the at least one crossmember and coupled thereto, the longitudinal portions each extending angularly from the transverse member and extending past a center line of a respective rear wheel assembly, wherein the rear subassembly further has two spring/shock absorber units each pivotally mounted on the respective longitudinal portion of the control arm and attached to the chassis frame, wherein the spring/shock absorber units each have a combined shock absorber/spring assembly, the chassis frame including spaced elongated rails longitudinally extending between rear and front portions of the body, wherein the elongated rails extend between the two spring/shock-absorbing units and above opposite ends of the crossmember and are attached thereto through elastomeric bushings.

15. The assembly of claim 14, wherein a coil spring of the spring/shock absorber unit resides above a tire of the respective wheel assembly.

16. A suspension assembly for a vehicle having a body, comprising:
   a chassis frame;
   a gaseous storage tank art ached to the body; and
   a rear suspension subassembly coupled to the chassis frame and straddling the gaseous storage tank, wherein the rear suspension subassembly includes at least one crossmember and two L-shaped control arms each having transverse and longitudinal portions, the transverse portions extending along the at least one crossmember and coupled thereto, the longitudinal portions each extending angularly from the transverse member and extending past a center line of a respective rear wheel assembly, wherein the rear suspension subassembly further includes an anti-roll bar having a central portion extending along and coupled to the crossmember, and bent end portions extending angularly from the central portion and articulately coupled to the longitudinal portions of the control arms at locations which are spaced from the free ends of the longitudinal portions.

17. A system for carrying compressed gas fuels onboard a vehicle comprising:
   a gaseous storage tank; and
   a suspension including two spaced crossmembers, two arms mounted between the two spaced crossmembers and coupled therewith, the two spaced anns and the two spaced crossmembers being sized and configured to extend around a gaseous storage tank and to define an unencumbered space between the suspension and the gaseous storage tank, wherein the two arms each have a transverse portion pivotally mounted to one of the two crossmembers and a longitudinal portion extending from the transverse portion and having a free end terminating past a centerline of a rear wheel assembly of the vehicle, the suspension further including a stabilizing link attached to the other crossmember and coupled with the free ends of the longitudinal portions of the arms.

18. The system of claim 17, wherein the two arms each have an L shape and are semi-trailing, each of the two arms supporting a respective spring/shock absorber, which extends between the respective arm and a respective rear wheel mount of the vehicle.

19. The system of claim 17, wherein the stabilizing link is articulately connected with the free ends of the two arms.

20. The system of claim 17, wherein the other crossmember is spaced rearward from the centerline of the rear wheel assemblies of the vehicle and the free ends of the two arms terminate in front of the centerline of the rear wheel assemblies.

21. The system of claim 17, wherein the one crossmember is spaced frontward from a centerline of the rear wheel assemblies of the vehicle and the free ends of the two arms terminate behind the centerline of the rear wheel assemblies.

22. The system of claim 17 further comprising an anti-roll bar having a transverse central portion coupled to the one crossmember and bent end portions articulately connected to the free ends of the arms.

23. The vehicle suspension of claim 17, wherein the gaseous storage tank is a single tank made from composite materials.

24. The vehicle suspension of claim 17, wherein the transverse portions of the two arms each extend toward a longitudinal axis of the vehicle at an angle differing from a right angle.

25. A system for carrying compressed gas fuels onboard a vehicle comprising:
a gaseous storage tank; and
a suspension including two spaced crossmembers, two arms mounted between the two spaced crossmembers and coupled therewith, the two spaced arms and the two spaced crossmembers being sized and configured to extend around a gaseous storage tank and to define an unencumbered space between the suspension and the gaseous storage tank, wherein the two arms each have two spaced transverse portions, each of which extends along and pivotally coupled to a respective crossmember, and a longitudinal portion extending between the transverse portions, the two arms and the two crossmembers defining a wishbone suspension, wherein the transverse portions of the two arms pivot about pivot axes extending parallel to a longitudinal axis of the vehicle.

26. The vehicle suspension of claim 25, wherein the two arms each have a U-shape composed of two J-shaped halves or a unitary U-shaped body.

27. The vehicle suspension of claim 26, wherein the U-shaped arms each support a respective spring/shock absorber, which extends between the respective arm and a respective rear wheel mount of the vehicle.

28. A vehicle suspension assembly comprising:
a chassis having two longitudinal rails and a crossmember connected to the longitudinal rails;
two L-shaped control arms each having a transverse portion pivotally connected to the crossmember and a longitudinal portion having a free end;
two wheel mounts each supported on the respective longitudinal portions of the control arms;
an anti-roll bar having a transverse central portion and bent portions connected to the longitudinal portions of the control arms at a distance from the free ends thereof; and
at least one stabilizing lateral link connecting the free ends of the longitudinal portions of the control arms, wherein the crossmember, the two L-shaped control arms, the anti-roll bar and the at least one stabilizing link are dimensioned to define an opening therebetween and to extend around a single gaseous storage tank extending through the opening, wherein the free ends of the longitudinal portions of the control arms terminate past a wheel centerline.

29. The vehicle suspension assembly of claim 28, wherein the control arms are semi-trailing arms.

30. The vehicle suspension assembly of claim 28 further comprising a pair of spring/shock absorber units one of each mounted on the longitudinal portion of one of the control arms and coupled to a respective wheel mount.

31. A vehicle suspension assembly comprising:
a chassis having two longitudinal rails and two crossmembers connected to the longitudinal rails;
two U-shaped arms each having a respective pair of transverse portions pivotally connected to the crossmembers and a longitudinal portion bridging the transverse portions;
two wheel mounts each supported on the respective longitudinal portions of the U-shaped arms, wherein the two crossmembers and the two U-shaped are dimensioned to define an opening therebetween and to straddle a single gaseous storage tank extending through the opening.

32. A method for enhancing lateral stability of a vehicle suspension unit, comprising the steps of:
providing two elongated chassis rails;
bridging the two elongated chassis rails by two spaced crossmembers;
providing two U-shaped control arms pivotally attached to the two spaced crossmembers, wherein the two crossmembers and two U-shaped arms form a wishbone suspension assembly provided with a central opening; and
providing a gaseous storage tank attached to the body of the vehicle and extending through the central opening of the wishbone suspension assembly.

* * * * *